United States Patent [19]

Komatsu

[11] 3,837,503
[45] Sept. 24, 1974

[54] HOISTING DEVICE FOR USE WITH CRANES

[75] Inventor: Toshiro Komatsu, Yokohama, Japan

[73] Assignee: Ishikawajima-Harima Jukogyo Kabushiki Kaisha, Tokyo, Japan

[22] Filed: Apr. 24, 1972

[21] Appl. No.: 246,745

[30] Foreign Application Priority Data
Apr. 27, 1971 Japan.............................. 46-34062

[52] U.S. Cl..................... 212/83, 212/11, 212/125
[51] Int. Cl............................................. B66c 19/00
[58] Field of Search........................... 212/124–129, 212/14, 15, 83, 10, 11

[56] References Cited
UNITED STATES PATENTS

| | | | |
|---|---|---|---|
| 2,357,443 | 9/1944 | Medenwald.......................... | 212/126 |
| 3,081,884 | 3/1963 | Minty................................... | 212/14 |
| 3,308,966 | 3/1967 | Fawell.................................. | 212/14 |
| 3,532,324 | 10/1970 | Crittenden........................... | 212/14 |
| 3,598,440 | 10/1971 | Ramsden............................. | 212/125 |
| 3,653,518 | 4/1972 | Polen................................... | 212/125 |

FOREIGN PATENTS OR APPLICATIONS

| | | | |
|---|---|---|---|
| 1,085,512 | 10/1967 | Great Britain....................... | 212/15 |
| 1,098,906 | 1/1968 | Great Britain....................... | 212/14 |

*Primary Examiner*—Evon C. Blunk
*Assistant Examiner*—James L. Rowland
*Attorney, Agent, or Firm*—Ernest F. Marmorek

[57] ABSTRACT

A trolley is provided in a set of two or more hoisting pulleys or sheaves on one side and another set of two or more hoisting pulleys or sheaves on the other side carried by a trolley frame which travels along a horizontal girder are so arranged as to mechanically move toward or away from each other, so that the loading and unloading of a cargo in a narrow space may be effected.

1 Claim, 8 Drawing Figures

HOISTING DEVICE FOR USE WITH CRANES

The present invention relates to generally hoisting machinery and more particularly a lifting or hoisting device for use with cranes which is capable of effecting the loading and unloading of cargo in a narrow space which has been hitherto impossible by the prior art hoisting devices.

In the prior art hoisting devices, the hoisting ropes are suspended through stationary pulleys or sheaves carried by a trolley so that the spacing between the hoisting ropes cannot be adjusted. Therefore the prior art hoisting devices cannot be used in a narrow space because the hoisting ropes make contact with the obstacles so that the lifting hook or the like cannot be lowered further. Furthermore, the lifting hook or the like and hence the cargo being lifted tend to swing when the trolley is stopped, thus presenting the problem in increasing the travelling speed of the trolley and endangering the safety of operation. The present invention was made to overcome these and other related problems of the prior art hoisting devices.

Briefly stated, the present invention is characterized in that two sets of hoisting pulleys or sheaves carried by a trolley frame which travels along a horizontal girder are so arranged as to mechanically move toward or away from each other in order to vary the spacing between the two sets of hoisting pulleys or sheaves.

The present invention is further characterized in that pulleys or sheaves for ropes for preventing the swing of a cargo being lifted are fixed to said trolley frame, said ropes for preventing the swing of a cargo cross each other in the space between pulleys or sheaves fixed to a lifting member or the like and said pulleys or sheaves fixed to the trolley frame; and tension devices are fixed to the horizontal girder to give the tensions to said ropes for preventing the swing of a cargo, whereby the swing of the lifting member and hence the cargo being lifted may be prevented.

Figure 5:
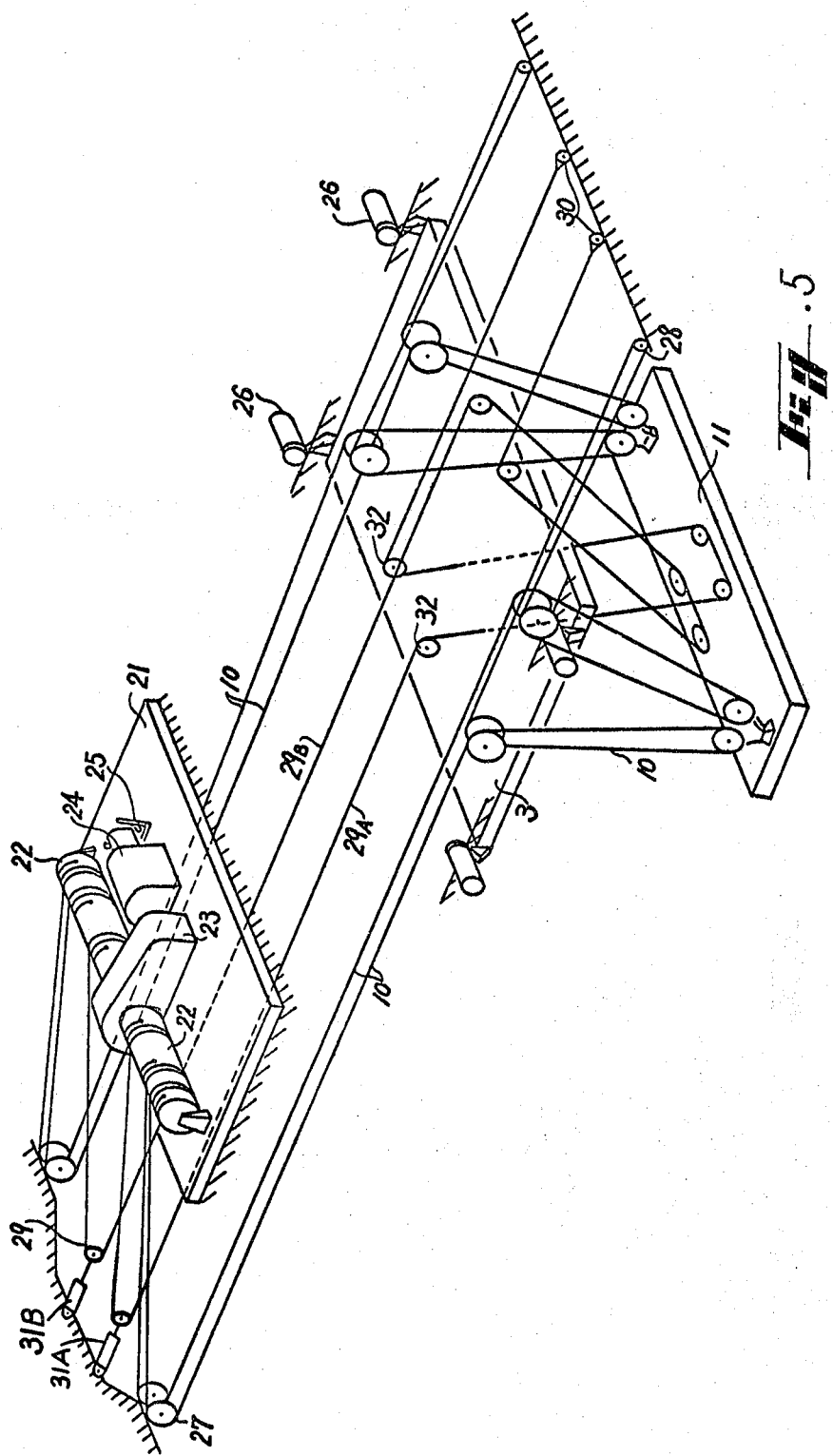
Figure 6:
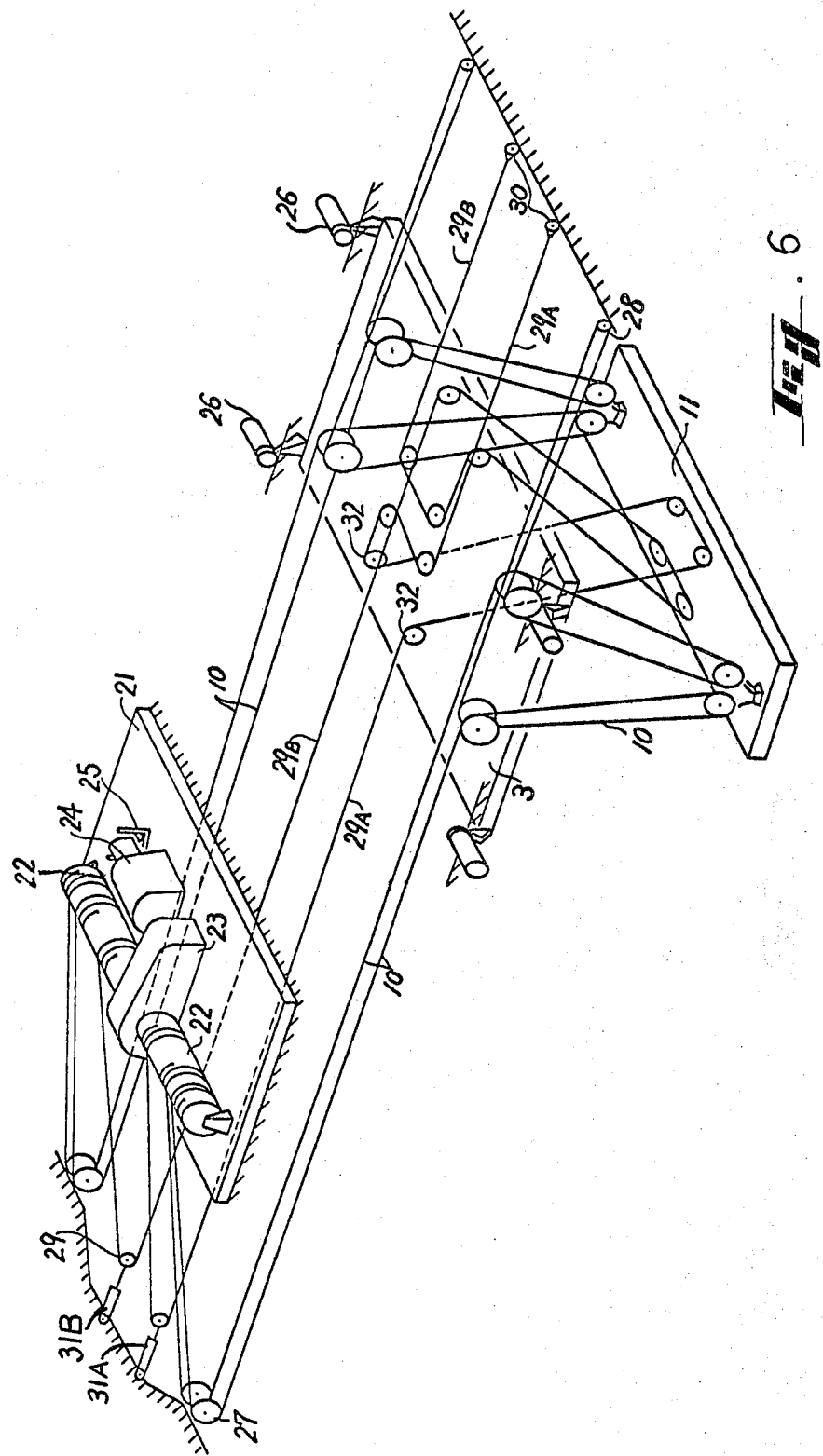
Figure 7:
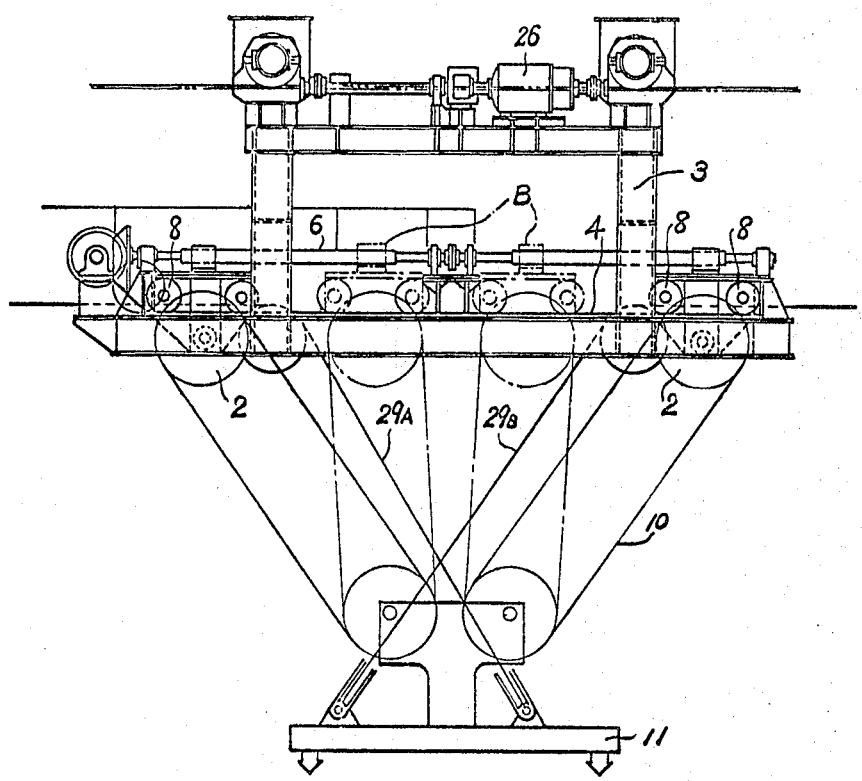
Figure 8:
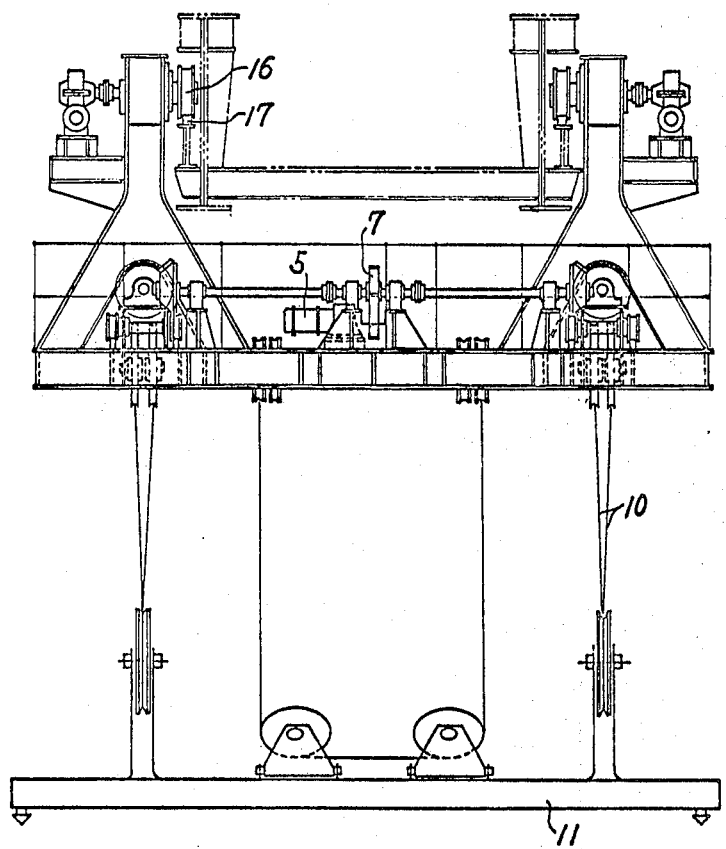

Each of FIG. 5 and 6 is a perspective view illustrating a second embodiment of a hoisting device in accordance with the present invention which is further provided with a device for preventing the swing of a lifting member and a cargo being lifted; and Each of FIGS. 7 and 8 is a view illustrating in more detail the first and second embodiments.

Figure 1:
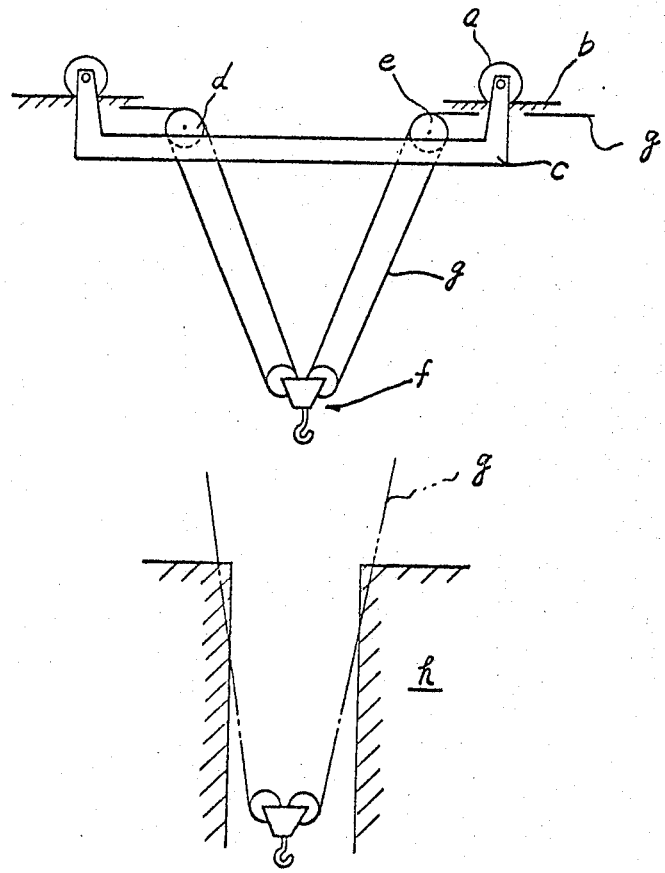
FIG. 1 is a schematic view used to explain the problems encountered in the prior art hoisting devices.

Prior to the description of the preferred embodiments of the present invention, the problems encountered in the prior art rope trolley type cranes will be briefly described with reference to FIG. 1. In general, a trolley frame $c$ is supported by wheels $a$ which travel on rails $b$, and carries hoisting pulleys or sheaves $d$ and $e$ around which are wound hoisting ropes $g$ through a hoisting hook $f$ and which are spaced apart from each other in order to stabilize the cargo when it is lifted, in order to prevent the swing motion of the cargo when it travels. However, when the crane is used in a narrow space, the hoisting ropes $g$ are made into contact with obstacles $h$ because the hoisting pulleys or sheaves $d$ and $e$ are spaced apart from each other, so that it becomes impossible to lift the cargo. The present invention was made to overcome this and other related problems.

Now referring to FIG. 2, the first embodiment of the present invention will be described, in which the hoisting or lifting device in accordance with the present invention is shown as being applied to a gantry crane. A trolley frame 3 supported by wheels 16 which travel along rails 17 on a girder or bridge 9 carries a stationary hoisting pulleys or sheaves 1 and movable pulleys or sheaves 2. The stationary hoisting pulleys or sheaves 1 are fixed to the trolley frame 3. The movable pulleys or sheaves 2 are carried by wheels 8 which travel along guide rails 4 on the trolley frame 3 and is driven by a pulley or sheave driving motor 5 mounted on the trolley frame 3 through a reduction gear 7 and a screw rod 6. Therefore, the movable pulleys or sheaves 2 are moved toward or away from the stationary pulley or sheave 1 so that the spacing L therebetween may be varied.

Figure 2:
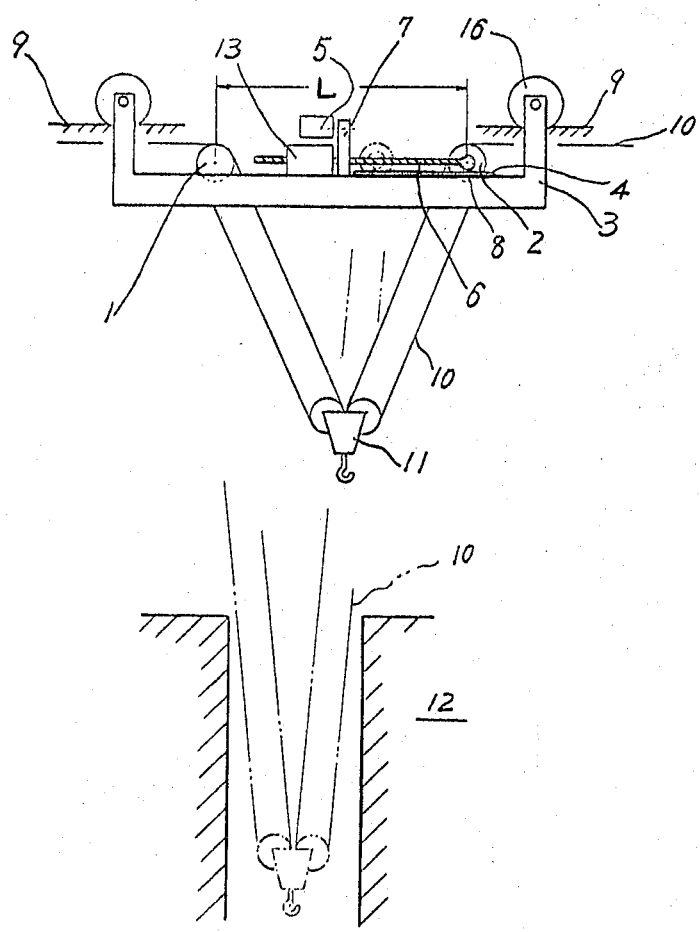
FIG. 2 is a front view of a first embodiment of a hoisting or lifting device in accordance with the present invention.
Figure 3:
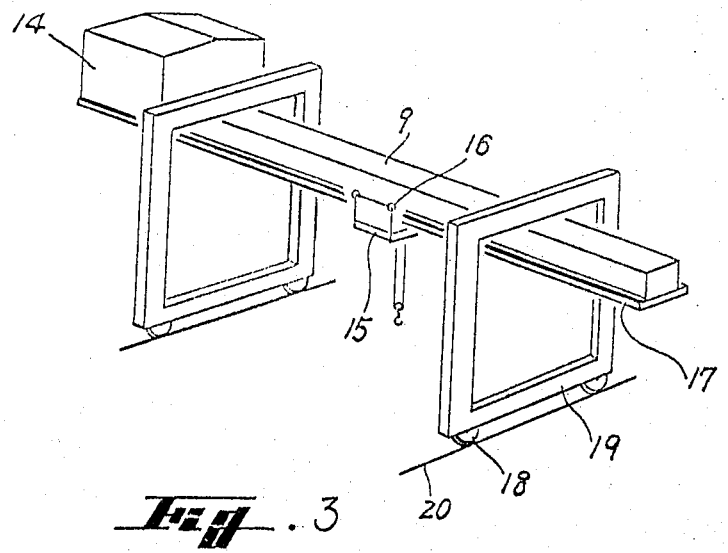
FIG. 3 is a schematic perspective view of one possible form of gantry cranes to which is applied the first embodiment of the present invention.
Figure 4:
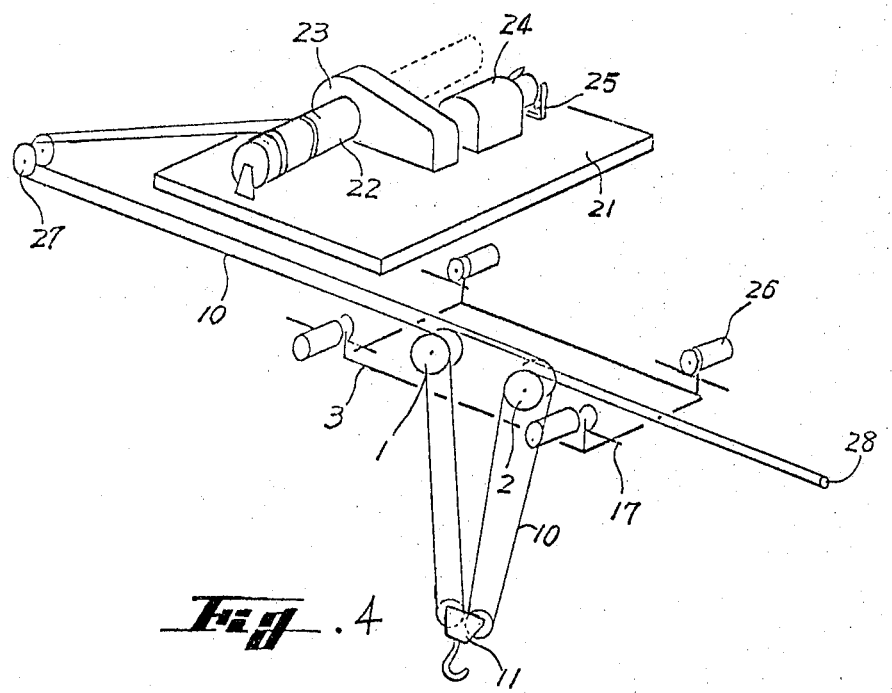
FIG. 4 is a perspective view illustrating the arrangements of machines in a machine room and of hoisting ropes of the first embodiment.

In FIG. 2, reference numeral 13 designates a screw box through which extends the screw rod 6; in FIG. 3, 14, a machine room; 15, a trolley; 18, wheels which support a leg or trestle 19 and travel along rails 20; in FIG. 4, 21, a floor in the machine room 14; 22, a hoisting drum; 23, a reduction gear box; 24, a hoisting motor; 25, a hoisting brake; 26, trolley driving motors; 27, pulleys or sheaves fixed to the girder; and 28, equalizer sheaves fixed to the girder or cantilever, to which the ends of the lifting ropes are fixed.

When the lifting device of the present invention is used in a narrow space as shown in FIG. 2 between obstacles 12, the pulley or sheave driving motor 5 is energized to move through the screw rod 6 the movable pulleys or sheaves 2 to the position indicated by the dashed lines so that the hoisting ropes 10 are moved toward each other and are prevented from making contact with the obstacles 12 when the bridge or girder is moved along the narrow space.

So far the hoisting device in accordance with the present invention has been described as being applied to the gantry crane, but it is of cource possible to apply to the cranes on wharfs. Instead of the lifting hook, a beam with hooks for lifting cargo of large size may be used. Furthermore, the hoisting device of the present invention may be applied to cranes for lifting unit cargo such as a container. In the instant embodiment, the hoisting ropes are so arranged as to lift the beams or containers of the standard sizes, but when the beams or containers of large sizes are lifted, an additional hoisting drum 22 in FIG. 4 shown by the dashed lines is provided so as to use four more additional ropes (not shown). Instead of the screw rod 6 which is driven by the motor 5, any other suitable mechanism may be employed to drive the movable pulleys or sheaves 2. If required, both pulleys or sheaves 1 and 2 may be so arranged as to be movable, and the number of hoisting pulleys or sheaves may be increased when required.

Next referring to FIGS. 5-8, the second embodiment of the present invention will be described hereinafter which is provided with pulleys or sheaves for ropes which are extended in order to prevent the swing of the cargo being lifted. In the first embodiment, when the trolley travels, the spacing between the two sets of pulleys or sheaves 1 and 2 is increased in order to stabilize the cargo, but it is preferable to provide the device for preventing the swing of the cargo when the speed of the trolley is increased. Especially in the cranes using the beams with hooks for handling the cargo of large size or unit cargo or containers, the higher travelling speed for trolleys is required. In the lifting device shown in FIGS. 5–8, in addition to the hoisting ropes 10 extended from the hoisting drum 22 to the trolley frame 3, ropes 29A and 29B for preventing the swing of the lifting device 11 are extended from the hoisting drum 22 and wound around pulleys or sheaves 32 fixed to the trolley frame 3 in such a manner that the ropes 29A and 29B may be extended simultaneously with the hoisting ropes 10. The ends of the ropes 29A and 29B are provided at 30, and in the positions opposite to the rope ends 30 are provided rope pulleys or sheaves 29 for the ropes 29A and 29B, and are also provided tension devices 31 for giving the tensions to the ropes 29A and 29B. It should be noted that the pulleys or sheaves 32 on the trolley 3 are so arranged as to prevent the ropes 29A and 29B from contacting with the obstacles and that the ropes 29A and 29B are so wound around the pulleys or sheaves 32 as to cross each other. Therefore, it is not required to adjust the spacings between the pulleys or sheaves 32 as in the case of the hoisting pulleys or sheaves 1 and 2.

Referring to FIG. 7, when the trolley 3 which has been moving to the right is suddenly stopped, the lifting device 11 and the cargo cannot remain immediately below the trolley 3 because of their inertia and continue to move to the right. Therefore, they start to swing. However, according to the present invention, the ropes 29A and 29B are provided so that the movement of the lifting device 11 and the cargo toward the right may be prevented by the rope 29A whereas the movement toward the left may be prevented by the rope 29B. In this manner, the swing of the lfiting device 11 and the cargo may be rapidly damped so that they may remain in a stationary position immediately below the trolley 3.

The tension devices 31 are provided in order to prevent the slacks of the ropes 29A and 29B, and to prevent the ropes 29A and 29B from being payed through contact with the cargo and function as dampers. Furthermore, the tension devices 31 are preferably of the type whose forces may be adjusted so that the forces exerted to the ropes 29A and 29B may be controlled.

The tension devices 31 may be removed to or duplicated at the positions 30. The ropes 29A and 29B for preventing the swing of the lifting device and the cargo may be wound around a separate drum drivingly coupled to the hoisting motor 24.

FIG. 6 shows a different view of FIG. 5 at the point of arrangement of the ropes 29A and 29B.

According to the present invention, the hoisting pulleys or sheaves of the cranes are movable so that the loading and unloading in the narrow space hitherto impossible by the prior art cranes become possible. Furthermore, the ropes for preventing the swing of the lifting device and hence the cargo being lifted are provided so that the loading and unloading operations may be much safequarded.

These figures show only a few of the possible forms of our invention, and needless to say there can be many other forms of our invention.

What is claimed is:

1. A device for loading and unloading cargo in a crane, said device including a trolley frame and a pair of hoisting girders for supporting and permitting movement of the trolley frame therealong, a lifting member and a fixed machine room having a hoisting drum, a reduction gear box and a hoisting motor, the machine room being spaced apart from the trolley frame, said device comprising four ropes wound around the hoisting drum for supporting the lifting member, two of said ropes being lead out of the central part of the drum and trained about a pair of first pulleys fixed to the girders, said two ropes including laterally oppositely angularly disposed sections trained about second pulleys mounted on said lifting member.

a pair of adjustable damper tension devices laterally spaced apart from each other and fixed relative to the girders and cooperating with said two ropes for applying displacement forces to said first pulleys whereby the lifting member is prevented from swinging by means of the force applied by one of said tension devices when the cargo tends to swing laterally to the right and by means of the force exerted by the other tension device when the cargo tends to swing laterally to the left.

* * * * *